Patented June 12, 1923.

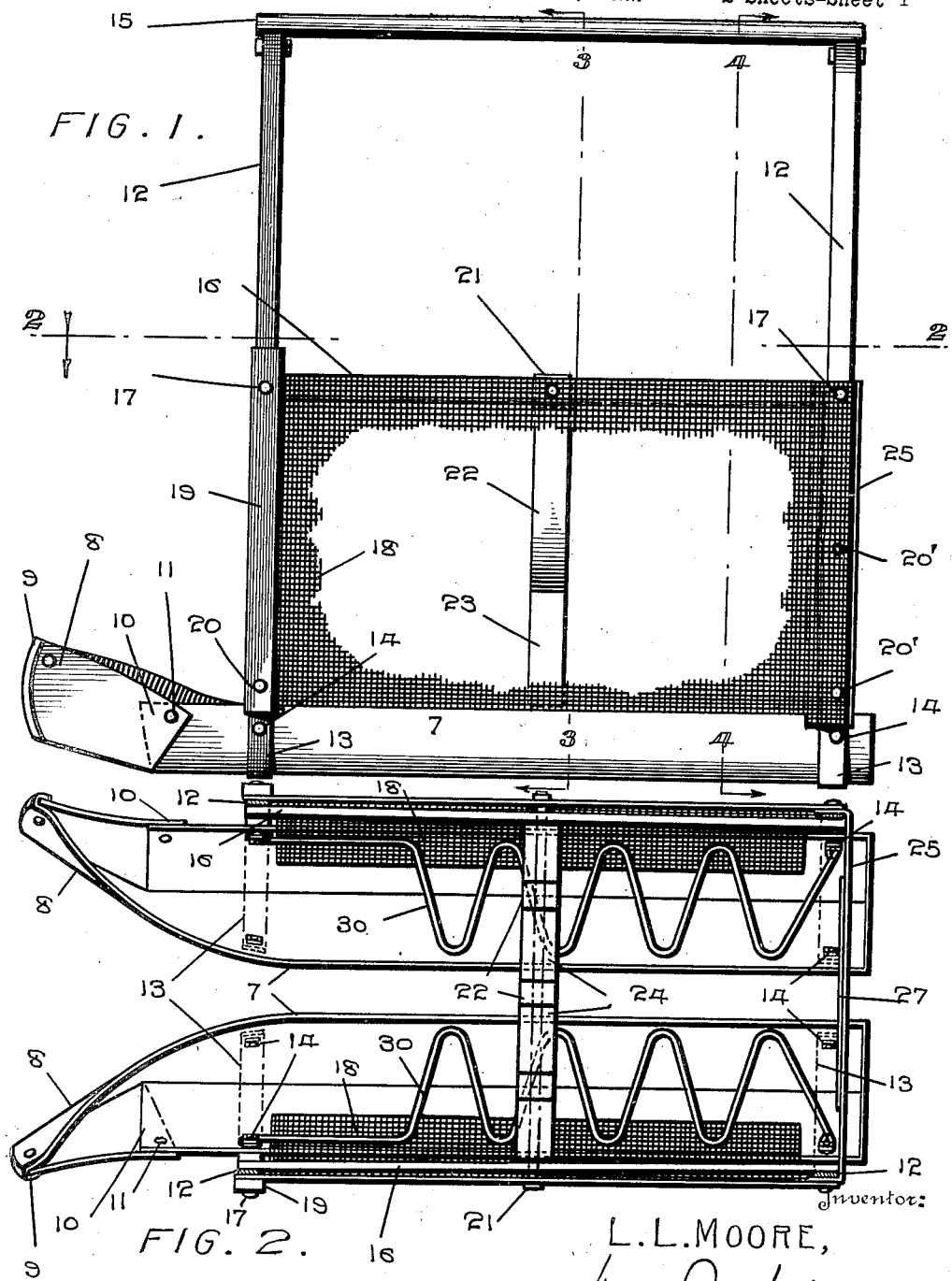

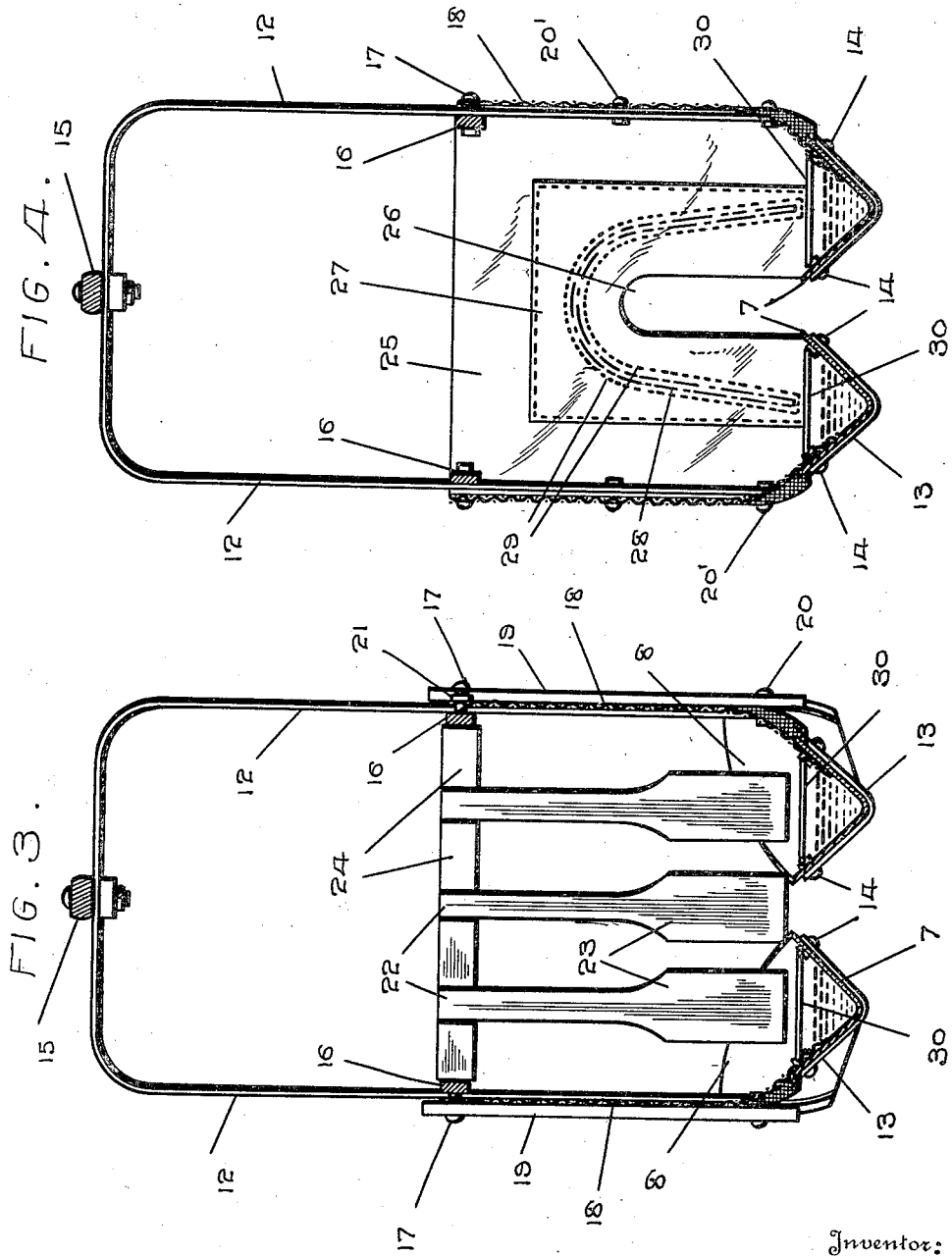

1,458,538

UNITED STATES PATENT OFFICE.

LESTER LEE MOORE, OF WINDER, GEORGIA.

BOLL-WEEVIL TRAP.

Application filed June 15, 1922. Serial No. 568,615.

*To all whom it may concern:*

Be it known that I, LESTER L. MOORE, a citizen of the United States, residing at Winder, in the county of Barrow and State of Georgia, have invented certain new and useful Improvements in Boll-Weevil Traps, of which the following is a specification, reference being had therein to the accompanying drawing.

The present invention relates to a portable trap adapted to be moved by hand over or astride a row of cotton or other growing plants for the purpose of dislodging boll-weevils, insects, or bugs from the vegetation for capturing and destroying them, and this invention is an improvement over the boll-weevil trap disclosed in my copending application Serial No. 478,869, filed June 20, 1921.

It is the object of the invention to provide such a trap having novel and improved features of construction to enhance the utility and efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of the trap, portions of the side screens being broken away.

Fig. 2 is a horizontal section on the line 2—2 of Fig. 1.

Figs. 3 and 4 are vertical sections on the respective lines 3—3 and 4—4 of Fig. 1.

The device comprises a pair of parallel longitudinal sheet metal pans 7 of trough-like formation, which are of V-shaped cross section, and which are spaced apart to provide a slot between them for accommodating the plants over which the device is moved. These pans or troughs are filled with liquid poison so that the insects dropped into the pans will be exterminated. The forward end portions 8 of the pans are curved or bent upwardly and outwardly away from one another in order that the plants will readily pass between the pans. The forward ends of the side walls of the pans have suitable seams 9, and the outer walls of said pans are split near their forward ends and the pans are bent so that the portions of the outer walls adjacent to the splits are overlapped, as at 10, which will bend the forward ends of the pans apart, and give said forward end portions of the pans the proper curved shape, as seen in Fig. 2. The overlapping portions 10 are riveted together, as at 11, and soldered or otherwise secured to prevent leakage.

Front and rear bows or arches 12, formed from bars of resilient metal, are located near the opposite ends of the pans, and have their terminals formed with V-shape hooks 13 fitted under and secured to the opposite sides of the pans by means of bolts 14 engaging through said hooks and walls of the pans near the upper edges of said walls. Said pans are thus seated and mounted in the hooked terminals of the bows ar arches, and the bolts or other securing elements secure the bows and pans together. A longitudinal handle bar 15 is secured at its opposite ends on the crown or yoke portions of the bows, for conveniently enabling the device to be lifted and carried by hand.

Longitudinal side bars 16 are secured at their ends, by means of bolts 17 or other securing elements, to the side portions of the bows 12 at suitable distances above the pans and below the handle bar 15, and side screens 18 of wire are disposed between the bars 16 and outer sides of the pans. Said screens or panels 18 have their upper edges overlapping the bars 16, and their lower edges extending to and overlapping the inner sides of the outer walls of the pans. The forward ends of the screens or panels 18 are clamped between the side portions of the front bow 12 and vertical cleats or strips 19 located at the outer sides of the bow. The upper ends of the strips 19 are engaged by the forward securing elements 17, and the lower ends of said strips are secured to the bows by bolts 20 or other securing elements. The rear ends of said screens are secured to the rear bow by the rear securing elements 17 and other bolts or securing elements 20'. Said screens or panels will prevent the insects, when loosened from the plants, from escaping out the sides above the pans or falling outwardly over the outer sides of said pans.

Agitating means is provided for dislodging the insects from the plants above the pans. Thus, a transverse rod 21 extends across the pans between the bows 12, and has its terminals engaged through the side bars 16. Transversely spaced pendulums 22 are suspended loosely from said rod 21, to swing forwardly and rearwardly, and the lower end portions of the pendulums are widened, as at 23, for increasing their weight and to prevent broader surfaces to the plants. The pendulums are spaced apart by means of spacers 24 on the rod 21.

The rear screen or panel 25, preferably of cloth, extends across the rear bow 12 below the rear ends of the bars 16 to the rear ends of the pans 7, and the side edges of the screen or panel 25 are preferably clamped between the rear bow 12 and rear ends of the side screens or panels 18. The screen or panel 25 has a slot 26 extending upwardly from the slot or space between the pans, through which the plants can pass out of the trap when moving the device over the row of plants.

In order to reenforce the panel 25 around the slot 26, a sheet 27 of cloth is sewed to the panel at the inner side thereof and is slotted the same as said panel. A wire arch 28 is disposed between the panel 25 and sheet 27 over the slot for stiffening the panel around said slot, and the panel 25 and sheet 27 are stitched together, as at 29, along lines immediately adjacent to and at the opposite sides of the arch 28, to retain said arch in place.

Guards are disposed in the mouths of the pans 7 to prevent the plants from dragging in the pans, and brushing the insects out of the pans. These guards, as shown, are composed of wire bent into zig-zag form, as at 30, and the forward and rear terminals of said wire guards are clamped by the bolts 14 at the outer sides of the pans. The bends of the guards 30 seat on the opposite walls of the pans, thereby supporting the guards at the mouths of the pans under the set of pendulum beaters or agitators 22.

In using the device, it is carried by the handle bar 15 and moved over the rows of plants, and the pendulums 22 in striking the plants will agitate and shake them, thereby dislodging the insects therefrom, which will fall into the pans or troughs 7. The pendulums serve as oscillating beaters or agitators, and will effectively loosen the insects from the plants. The side screens or panels 18 prevent the insects from falling outwardly over the outer sides of the pans, and the rear screen or panel 25 prevents the insects from escaping to the rear over the rear ends of the pans, although the slot 26 enables the rear screen or panel to pass over the plants. The rod 13 not only serves to support the pendulums or beaters, but also connect the opposite side bars 16 to make the frame more rigid. The wire guards 30 will prevent the plants from dragging on the bottoms of the pans, which would be liable to brush the insects out of the pans, and the plants are thus prevented from dipping down into the poison liquid or dragging in the pans.

Having thus described the invention, what is claimed as new is:—

1. A portable trap to be moved over plants comprising spaced longitudinal pans, front and rear bows connecting the pans, means for agitating the plants above the pans, a rear fabric panel secured to the rear bow and having a slot extending upwardly from between the pans, a sheet secured to the panel around said slot, and a stiffening arch located and secured between said panel and sheet over and around the slot.

2. A portable trap to be moved over plants comprising spaced longitudinal pans of V-shaped cross section, bows connecting the pans, and means for agitating the plants above the pans, the outer walls of the pans being split near their forward ends and the portions of said walls at the splits being overlapped and secured together to separate the forward ends of the pans.

3. A portable trap adapted to be moved along plants comprising a longitudinal pan having inclined side walls, means for agitating the plants over said pan, and a guard wire within said pan having its front and rear ends secured to the pan near the front and rear ends of the pan, the portion of the wire between its ends being of zig-zag form with its bends seating on said walls of the pan to support the intermediate portion of the wire and to prevent the plants from dragging in the pan.

In testimony whereof I hereunto affix my signature.

LESTER LEE MOORE.